US005561459A

United States Patent [19]

Stokes et al.

[11] Patent Number: 5,561,459

[45] Date of Patent: Oct. 1, 1996

[54] AUTOMATIC PROFILE GENERATION FOR A SELF-CALIBRATING COLOR DISPLAY

[75] Inventors: Michael Stokes, Cupertino; Andrew B. Morgan, San Jose; Jesse M. Devine, Sunnyvale, all of Calif.

[73] Assignee: Apple Computer, Inc., Cupertino, Calif.

[21] Appl. No.: 312,977

[22] Filed: Sep. 30, 1994

[51] Int. Cl.[6] .................. H04N 17/02

[52] U.S. Cl. .................. 348/180; 348/184; 348/182; 345/904

[58] Field of Search .................. 348/180, 174, 348/182, 190, 184, 177, 189, 380, 381, 655, 687, 679, 675, 658; 364/571.01; 345/904, 154, 150, 153; H04N 17/02, 9/73

[56] References Cited

U.S. PATENT DOCUMENTS

| | | | |
|---|---|---|---|
| 4,742,387 | 5/1988 | Oshima | 348/180 |
| 4,962,418 | 10/1990 | Kamaga | 358/29 |
| 4,985,853 | 1/1991 | Taylor et al. | 364/521 |
| 5,371,537 | 12/1994 | Bohan et al. | 348/189 |
| 5,400,086 | 3/1995 | Sano et al. | 348/655 |

FOREIGN PATENT DOCUMENTS

| | | |
|---|---|---|
| 0076076 | 4/1983 | European Pat. Off. . |
| 0313795 | 5/1989 | European Pat. Off. . |

*Primary Examiner*—Safet Metjahic
*Assistant Examiner*—Nina N. West
*Attorney, Agent, or Firm*—Burns, Doane, Swecker & Mathis, LLP

[57] ABSTRACT

A method and system for formatting characteristic CRT information into a standardized format to provide a dynamic CRT characteristic profile to enhance presently used methods of recalibrating CRTs is disclosed. Present CRT parameters are measured and combined with previously acquired calibration parameters in order to create updated characteristic information for the profile. The characteristic information includes the CRT color gamut, the white and black point of the CRT and the gamma of the CRT. In addition, ambient lighting conditions may be included in the profile. This characteristic information is stored in a CRT characterization profile in a standardized format. The profile is updated whenever the CRT is recalibrated or whenever the operating conditions of the CRT are changed. Further, the profile may be employed to recalibrate a destination CRT based on a source CRT's profile.

32 Claims, 2 Drawing Sheets

AUTOMATIC PROFILE GENERATION FOR A SELF-CALIBRATING COLOR DISPLAY

FIELD OF THE INVENTION

The present invention relates to CRT calibration techniques and specifically to a techniques for establishing white point and gamma settings for a CRT.

BACKGROUND OF THE INVENTION

Calibration of a CRT display is performed to ensure that the monitor's colors are perceptually acceptable to a given display viewer. In general, CRT calibration is initially performed in a factory environment to ensure that when consumers buy a CRT it provides accurate color settings. Subsequent recalibration is also performed to compensate for shifts in CRT display characteristics over time.

In prior art methods, the processes of calibration and recalibration are performed by measuring given light emission characteristics from the display screen. These are used to determine how to adjust settings within the computer system in order to cause the CRT to display targeted color characteristics.

One prior art method employed to perform CRT calibrations attaches an external light measuring apparatus, such as a spectraradiometer, to the display screen to measure the emission characteristics of each of the red, green, and blue phosphors of the screen for a target white point having known set of chromaticity values. These emission characteristics are translated into three tristimulus values, also referred to as chromaticity values, for each phosphor color, i.e. nine values in all. The CRT settings are then manually adjusted so as to match the tristimulus readings to the known chromaticity values for the targeted white point.

Alternately, instead of manually adjusting the settings, another prior art method utilizes the computer system's central processing unit (CPU) to perform the CRT setting adjustments. This method entails externally measuring the emission characteristics of the red, green, and blue phosphors and entering these values into the CPU. The CPU contains a color correction mechanism that compares the chromaticity of the target white point value to the measured chromaticity displayed on the screen and adjusts the CRT settings accordingly.

Another method is described in U.S. patent application Ser. No. 08,036,349 entitled, "Method and System of Achieving Accurate White Point Setting of a CRT Display", assigned to the Assignee of the present invention. This method entails first performing an initial measurement and then a calibration step. The initial measurement and calibration procedures are typically performed in the factory where the CRT is assembled.

The initial measurement step includes using an external spectraradiometer to measure tristimulus values for a given image having a know white point setting. In addition, the calibration system as disclosed in U.S. patent application Ser. No. 08,036,349 includes hardware to measure individual beam currents for each of the cathodes of the CRT. This beam current measurement was not previously performed in the prior art methods.

The measured tristimulus values along with the beam currents are used to mathematically generate nine normalized tristimulus values, which are stored in a calibration memory.

The initial factory CRT calibration step, involves calibrating the CRT to an arbitrary white point using the normalized tristimulus values. Target beam currents are calculated using the normalized tristimulus values to achieve the white point setting such that the CPU generates a digital video signal to display the white point on the CRT. These target beam currents are subsequently stored. The analog beam current is then measured and compared to the calculated target beam current for the chosen white point setting. The beam current setting is subsequently adjusted to match the target beam current for the chosen white point setting.

Performing subsequent recalibration steps outside of the factory environment using the method and system as described in U.S. patent application Ser. No. 08,036,349 is easily accomplished by re-displaying the original white point image and comparing the resulting beam currents to the original target beam currents stored in the calibration memory. The CPU makes necessary adjustments to the CRT to adjust the beam current to match the target beam current. This recalibration step is completely internal to the system due to the system and method of U.S. patent application Ser. No. 08,036,349

The present invention is a method and system that utilizes the present beam current measurements along with the normalized tristimulus values obtained from the measurement techniques developed in U.S. patent application Ser. No. 08,036,349 to further simplify the recalibration process. In addition, the method and system uses ambient display conditions, along with the CRT characteristics to facilitate matching a given CRT display characteristics to other color CRT displays.

SUMMARY OF THE INVENTION

The present invention is a method and system that formats characteristic CRT information into a standardized format to provide a dynamic CRT characteristic profile. This profile is used to enhance presently used methods of recalibrating CRTs. The profile is also used to facilitate the implementation of matching display characteristics of more than one CRT by transporting the formatted profile of a source device to a destination device and recalibrating the destination device accordingly.

In the method of the present invention, the characterization profile is updated each time the user requests recalibration. If a profile has not been created yet, recalibrating the CRT causes a profile to be created for the first time. Profile updating also occurs when the user changes CRT settings or selects different whitepoint settings. In this instance, the CRT is recalibrated and the profile is subsequently updated.

In the method of the present invention the measurements necessary to create or update the CRT characterization profile reflecting the present CRT settings are obtained when the CRT is recalibrated. In the preferred embodiment this profile information is created by internally measuring present beam currents. The present beam current measurements are combined with previously acquired calibration information to generate the appropriate profile information to be stored in the CRT profile. In another embodiment, the information to be stored in the profile may be obtained by using prior art measuring methods using an external spectraradiometer.

In the preferred embodiment, the information stored in the formatted profile at least includes full red, green and blue tristimulus values representing the gamut of the CRT, the tristimulus values corresponding to the white and black points of the CRT, in addition to the gamma values for each of red, green, and blue. Other embodiments may include other information such as ambient lighting condition information.

The characteristic information may be stored in any formatted manner, however, in the preferred embodiment, the characteristic information is formatted in an Apple ColorSync profile to facilitate ease of translation between systems familiar with this particular format. Similarly, a format that is universally familiar to all color operating system is desirable such that recalibrating to any destination device is possible, e.g. International Color Consortium (I.C.C.) profile format.

The formatted CRT profile is particularly applicable to matching a source device to a destination device. This method involves the steps of transmitting a CRT profile corresponding to a source device to a destination device, recalibrating the destination device to display in the same manner as the source device and then updating the destination device's profile to reflect the new CRT settings resulting from the recalibration.

DETAILED DESCRIPTION

Figure 1:
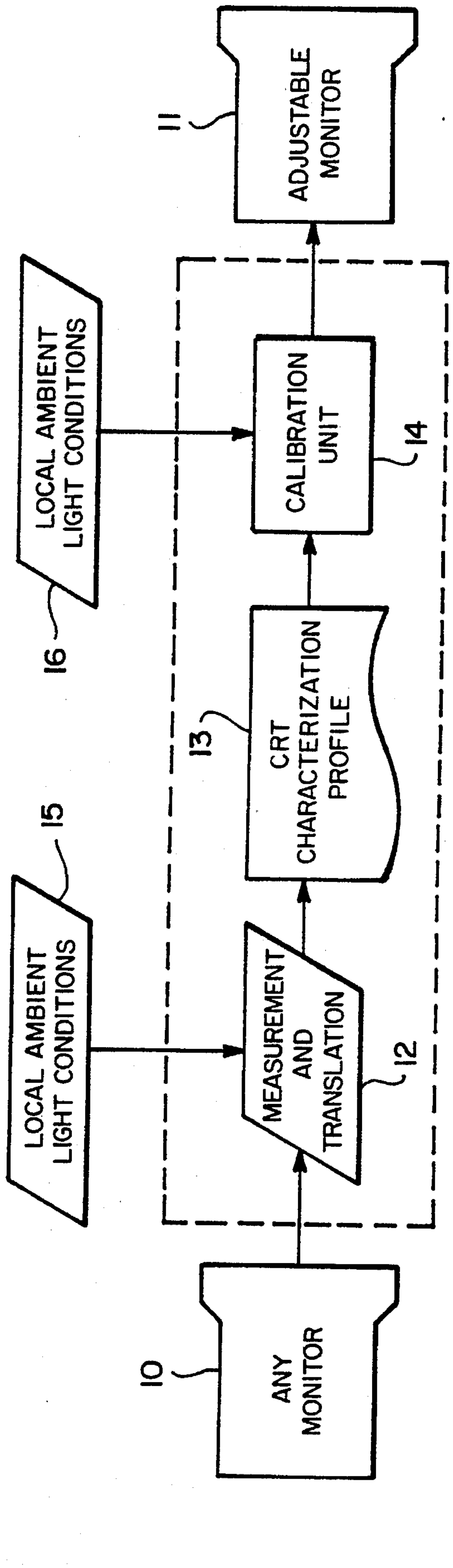
FIG. 1 illustrates an embodiment of the system of the present invention.

The present invention is a method and system that formats characteristic CRT information into a standardized format to provide a dynamic CRT characteristic profile to enhance presently used methods of recalibrating CRTs. In the following description, numerous specific details are set forth, such as specific CRT parameters, methods to calculate certain characteristic values, specific formats, etc., in order to provide a thorough understanding of the present invention. It will be obvious, however, to one skilled in the art that these specific details need not be employed to practice the present invention. In other instances, well-known computer system architectures have not been described in detail in order to avoid unnecessarily obscuring the present invention.

The method and system of the present invention creates a formatted device characterization profile that is used to store present CRT characteristic information. The profile characterization information that is stored in the profile includes, the gamut of the CRT, the white point setting, the black point setting, and the gamma—each being described below. Other information that may be included is the local ambient conditions of the CRT.

Gamut: The gamut of the CRT is the maximum range of colors that the CRT can display. Specifically, this is limited to the maximum amount of voltage that may be applied to each of the cathodes of the CRT. The gamut is represented by three tristimulus values per red, green, and blue phosphor. Thus the gamut is defined by "full" red, "full" green and "full" blue tristimulus values plus the white and black points.

White Point: The white point of the display defines some desired relationship between the red, green, and blue tristimulus values at the system's maximum digital settings to provide a specific color on the display. For instance, for a four bit color value, the maximum digital setting would be 1111. Often times the white point is chosen such that it causes the display screen to display some shade of white depending on the device or application of the device displaying the image. The white point setting is defined by three tristimulus values, one for each of the red, green and blue phosphors.

Black Point: The black point of the display defines some desired relationship between the red, green, and blue tristimulus values at system's minimum digital settings to provide a specific color on the display. For instance, for a four bit color value, the minimum digital setting would be 0000. Often times the black point is chosen such that it causes the display screen to display some shade of black depending on the device or application of the device displaying the image. The black point setting is defined by three tristimulus values, one for each of the red, green and blue phosphors.

Gamma: Defines the relationship between cathode voltage and luminance of each of the red, green, and blue phosphors. This relationship is embodied in a gamma table for each cathode. The values in each table defines the relationship between the beam currents of the cathodes and their driving voltages.

The formatted profile information described above may be measured directly using the prior art method of placing a spectraradiometer to the screen or may be obtained by employing the method and system of the U.S. patent application Ser. 08,036,349.

To measure the profile information by prior art methods, CRT settings are adjusted and then the spectraradiometer measures tristimulus values. For instance, to measure the gamut of the display, the spectraradiometer would measure the tristimulus values for each of the "full" red, "full" green, and "full" blue cathode voltage settings independently. White point tristimulus values would be obtained by setting all of the cathode voltages to the "full" setting at the same time. This prior art procedure tends to be cumbersome if it is desired to perform profile updating on the fly since each time an update is done a spectraradiometer would need to be attached to the screen.

The method as described in U.S. patent application Ser. No. 08,036,349 teaches a method and system that allows the user to obtain the above profile information without external devices. This is accomplished by first performing a factory calibration step as describe by U.S. patent application Ser. No. 08,036,349. The factory calibration procedure obtains and stores two parameters; 1) normalized tristimulus values and 2) beam currents in a calibration memory.

During the calibration procedure, the normalized tristimulus values are determined by applying voltages to each of the individual cathodes and measuring the corresponding beam current and calculating the resulting tristimulus value. The set of tristimulus values obtained from the present readings are then normalized by dividing each by the relevant beam current. There are three tristimulus values per cathode thus there are nine normalized tristimulus values. These normalized tristimulus values and beam currents are stored in the calibration memory of the CRT.

Updating the profile is accomplished by using the previously acquired calibration information stored in the calibration memory in addition to taking beam current measurements using the method as described in U.S. patent application Ser. No. 08,036,349. The beam current measurements and the information stored in the calibration memory are used to calculate the final profile characterization parameters according to the below equations.

Gamut: Is defined by the white and black points and a set of nine tristimulus values. The equations for generating the nine tristimulus values ($X_R$, $Y_R$, $Z_R$, $X_B$, $Y_B$, $Z_B$, $X_G$, $Y_G$, $Z_G$) are:

$$\text{RED}\quad \begin{aligned} X_R &= (Rmax)Xr + (Gmin)Xg + (Bmin)Xb \\ Y_R &= (Rmax)Yr + (Gmin)Yg + (Bmin)Yb \\ Z_R &= (Rmax)Zr + (Gmin)Zg + (Bmin)Zb \end{aligned}$$

$$\text{GREEN}\quad \begin{aligned} X_G &= (Rmin)Xr + (Gmax)Xg + (Bmin)Xb \\ Y_G &= (Rmin)Yr + (Gmax)Yg + (Bmin)Yb \\ Z_G &= (Rmin)Zr + (Gmax)Zg + (Bmin)Zb \end{aligned}$$

$$\text{BLUE}\quad \begin{aligned} X_B &= (Rmin)Xr + (Gmin)Xg + (Bmax)Xb \\ Y_B &= (Rmin)Yr + (Gmin)Yg + (Bmax)Yb \\ Z_B &= (Rmin)Zr + (Gmin)Zg + (Bmax)Zb \end{aligned}$$

where:

—Rmin, Gmin, and Bmin refer to the present measured current coupled to the CRT for the system's minimum digital input signal for that particular color;

—Rmax, Gmax, and Bmax refer to the present measured current coupled to the CRT for the system's maximum digital input signal; and —Xr, Yr, Zr, Xb, Yb, Zb, Xg, Yg, Zg are the normalized tristimulus values obtained during factory calibration.

The white point tristimulus values (Xwp, Ywp, and Zwp) are determined by the following equations:

$$\text{White Point:}\quad \begin{aligned} Xwp &= (Rmax)Xr + (Gmax)Xg + (Bmax)Xb \\ Ywp &= (Rmax)Yr + (Gmax)Yg + (Bmax)Yb \\ Zwp &= (Rmax)Zr + (Gmax)Zg + (Bmax)Zb \end{aligned}$$

The black point tristimulus values (Xkp, Ykp, and Zkp) are determined by the following equations:

$$\text{Black Point:}\quad \begin{aligned} Xkp &= (Rmin)Xr + (Gmin)Xg + (Bmin)Xb \\ Ykp &= (Rmin)Yr + (Gmin)Yg + (Bmin)Yb \\ Zkp &= (Rmin)Zr + (Gmin)Zg + (Bmin)Zb \end{aligned}$$

Gamma: May be determined empirically or by performing some calculations, depending on the method employed. Gamma determination is explained in more detail in the explanation below.

It should be noted that other information may be acquired (via measurements or calculations) to determine the above CRT characteristics, such as phosphor aging information and face plate reflectivity information.

Each time the CRT is recalibrated, new beam currents are measured and thus the profile is updated so as to provide a present device characterization profile.

The method of updating the profile in accordance with the present invention may be implemented by a software application. The application may be initiated by the user specifying that a CRT characterization profile be created. The user may also cause the profile to be updated by requesting recalibration of the device. After recalibration the application would automatically update the profile. Profiles may also be updated when the user specifies a new white point setting or when the user changes the contrast or brightness setting of the CRT. This type of profile update might be implicitly performed or may be explicitly requested.

One very useful application of the CRT characterization profile is to use it to transmit profile information from one CRT display to another for recalibration. Using this information allows a user to calibrate two CRTs similarly such that each display the colors in the same manner, within the physical limitations of the CRT.

FIG. 1 illustrates the embodiment of the system for transmitting the CRT characterization profile from CRT 10 to calibrate CRT 11. Measurement and translation block 12 represents the portion of the system that performs the acquisition and, if necessary, translation of the information needed to determine the values to be stored in the CRT characterization profile of the present invention. As described above, this may be performed by a prior art method by directly measuring the parameters using a spectraradiometer or using the method and system as described in U.S. patent application Ser. No. 08,036,349.

Block 15 represents the information obtained about the ambient lighting conditions for CRT 10. This information is subtracted from the characteristic profile information obtained above. Once the ambient conditions are subtracted from the above translated values, the information is stored in the chosen format.

The format is arbitrary. However, the present invention is significantly enhanced if a CRT characterization profile is selected such that it is a commonly recognized industry standard device characterization profile format specification. One type of universal profile format is used in the Apple ColorSync. color management system. Another known universal profile format is the I.C.C. profile format.

Once formatted into a profile, the characterization information is transmitted to calibration unit 14. Calibration unit 14 uses the information provided from CRT 10's profile along with the ambient light information provided by block 16 to calibrate CRT 11.

Figure 2:
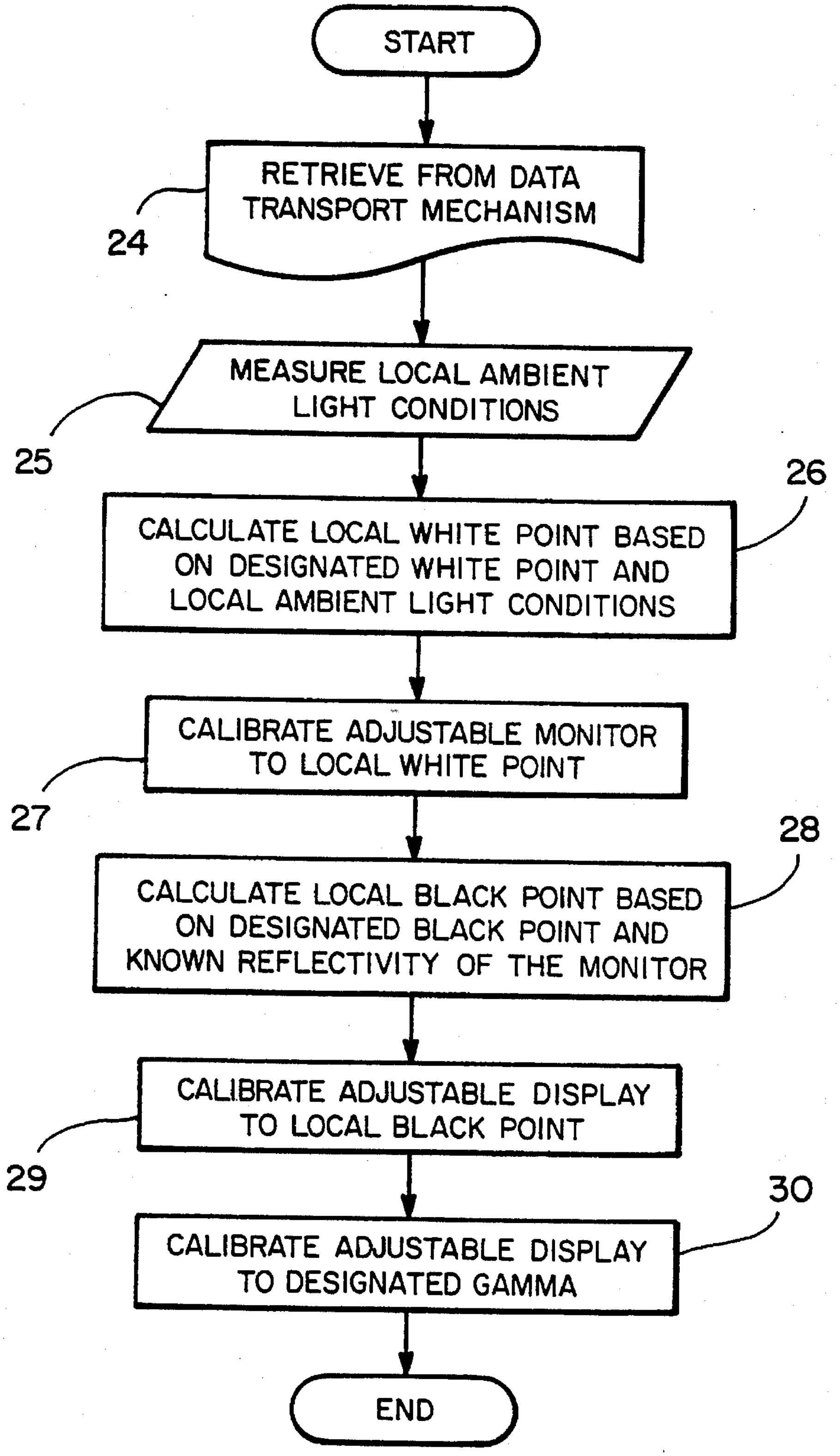
FIG. 2 illustrates a flow chart describing the steps required to implement the embodiment shown in FIG. 1.

Calibration unit 14 performs the steps as described in the flow chart shown in FIG. 2. As can be seen in FIG. 2, the first step (24) is to retrieve the data from the transmitted CRT characterization profile. In step 25, block 16 measures the ambient light conditions for CRT 11.

Next, the white point current values (Rwp, Gwp, Bwp) are calculated for CRT 11 based on and the white point tristimulus values (Xwp, Ywp, Zwp) and the nine tristimulus values ($X_R$, $Y_R$, $Z_R$, $X_B$, $Y_B$, $Z_B$, $X_G$, $Y_G$, $Z_G$) retrieved from the transmitted profile and taking into account the local ambient light conditions (step 26).

$$\begin{aligned} Rwp = {} & ((X_G Y_B - X_B Y_G)Zwp)/(X_R Y_G Z_B - X_G Y_R Z_B - \\ & X_R Y_B Z_G + X_B Y_R Z_G + X_G Y_B Z_{R-XB\,YG\,ZR}) + \\ & (Ywp(-(X_G Z_B) + X_B Z_G))/(X_R Y_G Z_B - X_G Y_R Z_B - \\ & X_R Y_B Z_G + X_B Y_R Z_G + X_G Y_B Z_{R-XB\,YG\,ZR}) + \\ & (Xwp(Y_G Z_B - Y_B Z_G))/(X_R Y_G Z_B - X_G Y_R Z_B - \\ & X_R Y_B Z_G + X_B Y_R Z_G + X_G Y_B Z_{R-XB\,YG\,ZR}) \end{aligned}$$

$$\begin{aligned} Gwp = {} & (-(X_R Y_B + X_B Y_R)Zwp)/(X_R Y_G Z_B - X_G Y_R Z_B - \\ & X_R Y_B Z_G + X_B Y_R Z_G + X_G Y_B Z_{R-XB\,YG\,ZR}) + \\ & (Ywp(-(X_R Z_B - X_B Z_R))/(X_R Y_G Z_B - X_G Y_R Z_B - \\ & X_R Y_B Z_G + X_B Y_R Z_G + X_G Y_B Z_{R-XB\,YG\,ZR}) + \\ & (Xwp(-(Y_R Z_B) + Y_B Z_R))/(X_R Y_G Z_B - X_G Y_R Z_B - \\ & X_R Y_B Z_G + X_B Y_R Z_G + X_G Y_B Z_{R-XB\,YG\,ZR}) \end{aligned}$$

-continued $$
\begin{aligned}
Bwp = {} & ((X_RY_G - X_GY_R)Zwp)/(X_RY_GZ_B - X_GY_RZ_B - \\
& X_RY_BZ_G + X_BY_RZ_G + X_GY_BZ_{R-XB\,YG\,ZR}) + \\
& (Ywp(-(X_RZ_G) + X_GZ_R))/(X_RY_GZ_B - X_GY_RZ_B - \\
& X_RY_BZ_G + X_BY_RZ_G + X_GY_BZ_{R-XB\,YG\,ZR}) + \\
& (Xwp(Y_RZ_G - Y_GZ_R))/(X_RY_GZ_B - X_GY_RZ_B - \\
& X_RY_BZ_G + X_BY_RZ_G + X_GY_BZ_{R-XB\,YG\,ZR})
\end{aligned}
$$

Step 27 entails calibrating CRT 11 using the calculated white point currents determined in step 26. This step is performed as described in U.S. patent application Ser. No. 08,036,349. Namely, the RGB gain is adjusted to obtain the transmitted white point setting.

Step 28 calculates the black point current values (Rk, Gk, and Bk) of CRT 11 based on the black point tristimulus values (Xk, Yk, Zk) and the nine tristimulus values ($X_R$, $Y_R$, $Z_R$, $X_B$, $Y_B$, $Z_B$, $X_G$, $Y_G$, $Z_G$) retrieved from the transmitted profile and taking into account the local ambient light conditions (step 26). As with step 26 the black point current values are calculated utilizing the below equations:

$$
\begin{aligned}
Rk = {} & ((X_GY_B - X_BY_G)Zk)/(X_RY_GZ_B - X_GY_RZ_B - \\
& X_RY_BZ_G + X_BY_RZ_G + X_GY_BZ_{R-XB\,YG\,ZR}) + \\
& (Yk(-(X_GZ_B) + X_BZ_G))/(X_RY_GZ_B - X_GY_RZ_B - \\
& X_RY_BZ_G + X_BY_RZ_G + X_GY_BZ_{R-XB\,YG\,ZR}) + \\
& (Xk(Y_GZ_B - Y_BZ_G))/(X_RY_GZ_B - X_GY_RZ_B - \\
& X_RY_BZ_G + X_BY_RZ_G + X_GY_BZ_{R-XB\,YG\,ZR}) \\
Gk = {} & (-(X_RY_B + X_BY_R)Zk)/(X_RY_GZ_B - X_GY_RZ_B - \\
& X_RY_BZ_G + X_BY_RZ_G + X_GY_BZ_{R-XB\,YG\,ZR}) + \\
& (Yk(X_RZ_B - X_BZ_R))/(X_RY_GZ_B - X_GY_RZ_B - \\
& X_RY_BZ_G + X_BY_RZ_G + X_GY_BZ_{R-XB\,YG\,ZR}) + \\
& (Xk(-(Y_RZ_B) + Y_BZ_R))/(X_RY_GZ_B - X_GY_RZ_B - \\
& X_RY_BZ_G + X_BY_RZ_G + X_GY_BZ_{R-XB\,YG\,ZR}) \\
Bk = {} & ((X_RY_G - X_GY_R)Zk)/(X_RY_GZ_B - X_GY_RZ_B - \\
& X_RY_BZ_G + X_BY_RZ_G + X_GY_BZ_{R-XB\,YG\,ZR}) + \\
& (Yk(-(X_RZ_G) + X_GZ_R))/(X_RY_GZ_B - X_GY_RZ_B - \\
& X_RY_BZ_G + X_BY_RZ_G + X_GY_BZ_{R-XB\,YG\,ZR}) + \\
& (Xk(Y_RZ_G - Y_GZ_R))/(X_RY_GZ_B - X_GY_RZ_B - \\
& X_RY_BZ_G + X_BY_RZ_G + X_GY_BZ_{R-XB\,YG\,ZR})
\end{aligned}
$$

Step 29 calibrates CRT 11 utilizing the calculated black point current values. This is also accomplished using the methods as described in U.S. patent application Ser. No. 08,036,349.

Step 30 calibrates the display system (which includes the CRT 11 and its associated CPU and digital graphics card) to the designated gamma. This step may be carried out by the prior art method by turning off any existing gamma correction and aiming a photometer at the monitor to measure the luminance value of each of the red, green, and blue at the same time while ramping from full black to full white at constant intervals. This method yields a gamma table representing the monitors natural, or uncorrected gamma. From this, the necessary correction to achieve the designated gamma curve can be calculated. The correction is then entered into the system programmatically and the graphic device driving the monitor will cause the CRT to reflect the new gamma correction.

In the preferred embodiment, gamma calibration is performed by turning off any existing gamma correction and using the system as described in U.S. patent application Ser. No. 08,036,349 to calculate the luminance of each of the red, green, and blue at the same time while ramping from full black to full white at constant intervals. This method yields a gamma table representing the monitors natural, or uncorrected gamma curve. From this, the necessary correction to achieve the designated gamma curve can be calculated. The correction is then entered into the system programmatically and the graphic device driving the monitor will cause the CRT to reflect the new gamma correction.

An alternative method is to use the system as described in U.S. patent application Ser. No. 08,036,349 to calculate the luminance level of full white and the luminance level of mid white. This yields an exponent representing the monitors natural, or uncorrected gamma curve. From this, the necessary correction to achieve the designated gamma curve can be calculated. The correction is then entered into the system programmatically and the graphic device driving the monitor will cause the CRT to reflect the new gamma correction.

Although the elements of the present invention have been described in a conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

I claim:

1. In a computer system having a CRT display screen including red, green, and blue cathodes each having an associated beam current, an apparatus comprising:

- a means for measuring present parameters from said CRT display screen;
- a means for translating said present parameters into characteristic information about said CRT display screen;
- a means for storing said characteristic information in a standardized format, said standardized format making said characteristic information usable for recalibrating other CRT display screens;

means for updating said characteristic information to reflect new parameters.

2. The apparatus as described in claim 1 wherein said measuring means is internal to said computer system.

3. The apparatus as described in claim 2 wherein said present CRT parameters includes present values of said associated beam currents.

4. The apparatus as described in claim 3 wherein said characteristic information includes full gamut red, green, and blue tristimulus values, tristimulus values corresponding to white and black points and red, green, and blue gamma values.

5. The apparatus as described in claim 4 further including a means for sensing ambient conditions, said sensing means characterizing said ambient conditions so as to provide ambient characteristic information, said ambient characteristic information being included with said characteristic information.

6. The apparatus as described in claim 5 further including a means for sensing ambient lighting conditions of said CRT, said sensing means characterizing said ambient lighting conditions so as to provide ambient characteristic information, said ambient characteristic information being included with said characteristic information.

7. The apparatus as described in claim 1 wherein said format corresponds to the format associated with the ColorSync device profile.

8. The apparatus as described in claim 1 wherein said format is a commonly recognized industry standard device characterization profile format specification.

9. In a computer system having a CRT display screen including red, green, and blue cathodes each having an associated beam current, a method of calibrating a CRT display screen comprising the steps of:

measuring present parameters associated with said CRT by performing measurements internal to said computer system;

translating said present parameters into characteristic information;

storing said characteristic information in a standardized format in said computer system, said standardized format making said characteristic information usable for recalibrating other CRT display screens;

recalibrating said CRT wherein new parameters associated with said CRT are obtained;

updating said characteristic information with said new parameters.

10. The method as described in claim 9 wherein said measuring and recalibrating step is performed internal to said computer system.

11. The method as described in claim 10 wherein said present parameters include present values of said associated beam currents.

12. The method as described in claim 11 wherein said characteristic information includes full gamut red, green, and blue tristimulus values, tristimulus values corresponding to white and black points and red, green, and blue gamma values.

13. The method as described in claim 12 wherein said method further includes changing one of the contrast and brightness setting before recalibrating said CRT.

14. The method as described in claim 12 wherein said method further includes the step of resetting the white point before recalibrating said CRT.

15. In a system including a source CRT display and a destination CRT display, a method for recalibrating said destination CRT using characteristic information provided by said source CRT display comprising the steps of:

measuring present parameters associated with said source CRT;

translating said present parameters into characteristic information;

storing said characteristic information in a formatted manner to create a source CRT characteristic profile defining said source CRT having a particular set of operating conditions, said profile having an associated profile format;

transmitting said characteristic profile to said destination CRT;

recalibrating said destination CRT utilizing said characteristic profile so as to cause the destination device's color characteristics to be perceptually the same as the source device's color characteristics.

16. The method as described in claim 15 wherein said recalibrating step is performed internal to said system.

17. The method as described in claim 16 wherein due to said profile format said characteristic information is usable by other CRT display screens familiar with said profile format for recalibration.

18. The method as described in claim 17 wherein said profile format is a commonly recognized industry standard device characterization profile format specification.

19. The method as described in claim 18 wherein said profile format corresponds to the profile format associated with the ColorSync device profile.

20. The method as described in claim 19 wherein after said step of translating said present parameters into characteristic information, ambient lighting conditions of said source CRT are measured and said measured ambient lighting conditions are subtracted from said characteristic information.

21. The method as described in claim 20 wherein after said step of transmitting said characteristic profile to said destination CRT, ambient lighting conditions of said destination CRT are measured, said measured ambient lighting conditions of said destination CRT being used to recalibrate said destination CRT.

22. The method as described in claim 21 wherein said present parameters include present values of said associated beam currents.

23. The method as described in claim 22 wherein said characteristic information includes full gamut red, green, and blue tristimulus values, tristimulus values corresponding to white and black points and red, green, and blue gamma values.

24. In a system including a source CRT display and a destination CRT display, a method for recalibrating said destination CRT using characteristic information provided by said source CRT display comprising the steps of:

measuring present parameters associated with said source CRT;

translating said present parameters into characteristic information;

storing said characteristic information in a formatted manner to create a source CRT characteristic profile defining said source CRT having a particular set of operating conditions, said profile having an associated profile format:

transmitting said characteristic profile to said destination CRT;

recalibrating said destination CRT utilizing said characteristic profile so as to cause the destination device's color characteristics to be perceptually the same as the source device's color characteristics.

25. The method as described in claim 24 wherein said recalibrating step is performed external to said system.

26. The method as described in claim 25 wherein due to said profile format said characteristic information is usable for recalibrating other CRT display screens.

27. The method as described in claim 26 wherein said profile format is a commonly recognized industry standard device characterization profile format specification.

28. The method as described in claim 27 wherein said profile format corresponds to the profile format associated with the ColorSync device profile.

29. The method as described in claim 28 wherein after said step of translating said present parameters into characteristic information, ambient lighting conditions of said source CRT are measured and said measured ambient lighting conditions are subtracted from said characteristic information.

30. The method as described in claim 29 wherein after said step of transmitting said characteristic profile to said destination CRT, ambient lighting conditions of said destination CRT are measured, said measured ambient lighting conditions of said destination CRT being used to recalibrate said destination CRT.

31. The method as described in claim 30 wherein said present parameters include present values of said associated beam currents.

32. The method as described in claim 31 wherein said characteristic information includes full gamut red, green, and blue tristimulus values, tristimulus values corresponding to white and black points and red, green, and blue gamma values.

* * * * *